Aug. 27, 1929.  E. C. SULLIVAN  1,726,199
COMBINED COOKING AND STERILIZING UTENSIL
Filed Nov. 5, 1928

INVENTOR.
ELIZABETH C. SULLIVAN,
BY Robert M. Barr
ATTORNEY.

Patented Aug. 27, 1929.

1,726,199

UNITED STATES PATENT OFFICE.

ELIZABETH C. SULLIVAN, OF PHILADELPHIA, PENNSYLVANIA.

COMBINED COOKING AND STERILIZING UTENSIL.

Application filed November 5, 1928. Serial No. 317,129.

The present invention relates to sterilizing apparatus and more particularly to a combined cooking and sterilizing utensil for the preparation and preservation of infant's food.

Some of the objects of the present invention are to provide a utensil for cooking milk formulas and other infant preparations and simultaneously sterilizing nursing bottles or other containers in which the milk or other preparations are to be stored for use; to provide a cooking and sterilizing apparatus wherein there is a minimum of handling of the food and containers for the food; to provide a receptacle for a number of food containers which can be removed as a unit from the heating or sterilizing chamber to a refrigerator or other cold storage place; to provide a sanitary utensil for use in the handling and preparation of infant's milk and other foods; to provide a cooking and sterilizing utensil wherein the sterilizing water has access to all of the containers or other articles supported by the device and can freely circulate thereabout to insure complete cleansing, cooking and sterilization; to provide a utensil which can be hygienically used and operated by anyone however ignorant the person may be of sanitary principles; and to provide other improvements as will hereinafter appear.

Figure 1:
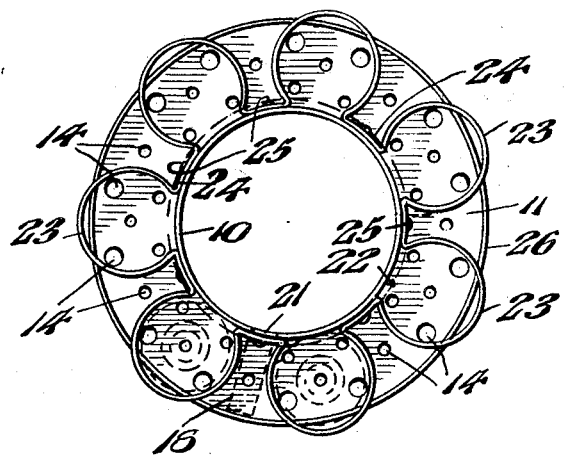
Figure 2:
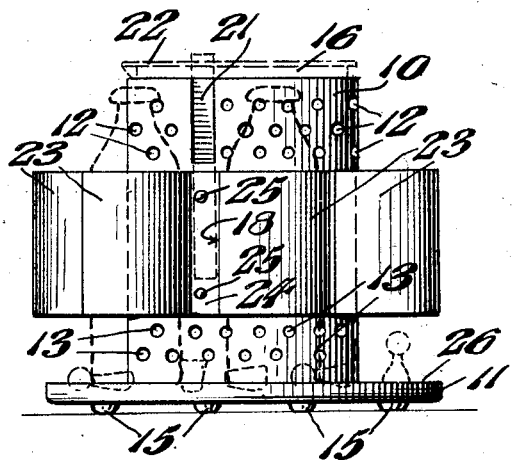
Figure 3:
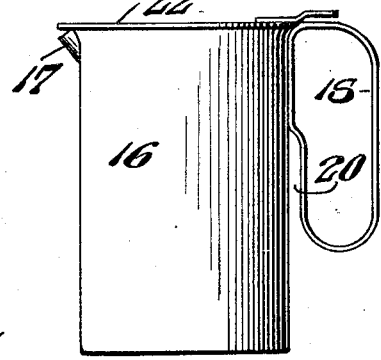

In the accompanying drawings, Fig. 1 represents a plan of a cooking and sterilizing utensil embodying one form of the invention with the cooking container removed therefrom; Fig. 2 represents a side elevation of the same and showing in dotted lines nursing bottles arranged in supported position; and Fig. 3 represents a side elevation of one form of cooking container for use with the utensil.

Referring to the drawings, one form of the present invention consists of an open ended tubular casing 10 which rises vertically from a bottom circumferentially arranged exterior flange 11 which forms a basal support for maintaining the device in an upright position. As here shown the casing 10 is provided with rows of perforations 12 adjacent its upper end and rows of like perforations 13 adjacent its lower end, these two sets of perforations permitting the sterilizing water to freely enter the interior of the casing 10 and circulate in the desired manner. Preferably also the base flange 11 is provided with perforations 14 for a like purpose and certain of these are formed by pressing the metal of the flange outwardly, as shown at 15, so that the flange itself is raised or spaced from the bottom of the sterilizing container in which the utensil is to be placed for the cooking and sterilizing operations.

For cooking milk, foods, and other preparations for infants, invalids or others, a cylindrical container 16 is provided on the general order of a pitcher in that it has a discharge spout 17 and handle 18 whereby it can be removed and its contents poured out. As shown, the handle 18 has a portion depending below its point of attachment with the container 16 in order to form a slot 20 which interfits with a portion of the casing while the joint of the handle rides into a notch 21 formed in one side of the casing 10. This construction allows the container 16 to fit well down into the casing 10 and leaving its top edge substantially flush with the top of the casing. This not only reduces the height of the utensil but brings the body of the cooking container into the zone of circulating hot water and steam. A cover 22 is provided for the container 16 and is placed thereover after the contents to be cooked have been poured into the container.

For the purpose of holding and supporting a plurality of nursing bottles so that they will be sterilized simultaneously with the cooking of the food in the container 16, that portion of the casing 10 which lies between the perforations 12 and 13 is used to support a plurality of pockets 23 which as here shown are formed of a continuous strip of metal so shaped as to provide a series of pockets of like configurations and size and having bridge pieces 24 fastened by rivets 25 or other fastening devices to the side of the casing 10. Each of the pockets 23 is of a shape to receive a nursing bottle so that the bottle is held snugly in place against lateral displacement while the bottom of the bottle rests upon the flange 11. Thus generally considered the preferred construction of the utensil discloses in plan a tubular casing 10 of circular contour surrounded by a concentric row of pockets which latter are in vertical alignment with the concentrically arranged flange 11, and hence a compact and rigidly portable utensil is provided for the purpose heretofore set forth.

In connection with the flange 11, it should be noted that it terminates in a circumferentially arranged lip 26 so that the flange in use serves as a shelf for supporting nipples, corks or for other small articles which it may be desired to sterilize at the same time the bottles are being sterilized and the contents of the container are being cooked.

In using the utensil, the milk or other preparation to be cooked is placed in the container 16, the cover 22 put on, and the container is then inserted in the casing 10 and substantially telescoped therewithin, though since the container is somewhat less in diameter than the casing sufficient clearance is provided about the container for the free circulation of the cooking water. The bottles to be sterilized are now placed in the respective pockets 23 and any nipples, corks or other articles to be also sterilized are placed upon the flange 11, and the unit can now be placed in a can or other receptacle containing water which is to be heated to the desired temperature to carry out the cooking and sterilizing operations. At the end of the cooking operation, the sterilization is completed and the utensil can be taken out of the cooking and sterilizing container and the contents of the container 16 can be poured into the bottles without removing the latter from the pockets. The sterilized corks are then inserted in the bottles and the utensil can then be placed in a refrigerator to preserve the contents of the bottles.

It will now be apparent that a complete unitary cooking and sterilizing utensil has been devised wherein both sterilizing and cooking operations can be simultaneously carried out while the handling of bottles, nipples, corks, and the like, is reduced to a minimum. Thus, after the bottles are placed in the pockets, there is no rehandling of them during the filling operations, no rehandling of them in transferring them from a sterilizer to a refrigerator and no rehandling of nipples other than the removal of them from the flange to place them upon a bottle when the latter is to be used.

Having thus described my invention, I claim:

1. A cooking and sterilizing utensil arranged to be enclosed in a cooking receptacle in an upright position to prevent spilling its contents comprising a container for milk or food, a casing arranged to removably receive said container, a plurality of pockets secured to said container for respectively holding articles to be sterilized simultaneously with the heating of said container, and a support for additional articles to be sterilized.

2. A cooking and sterilizing utensil arranged to be enclosed in a cooking receptacle in an upright position to prevent spilling its contents comprising a container for milk or food, a perforated casing arranged to receive said container in telescoped relation, a plurality of pockets encircling said casing for holding bottles to be sterilized simultaneously with the heating of said container, and a circumferential flange below said pockets for holding additional articles to be sterilized.

3. A cooking and sterilizing utensil arranged to be enclosed in a cooking receptacle in an upright position to prevent spilling its contents comprising a container for milk or food, a perforated casing arranged to receive said container in telescoped relation, a plurality of pockets encircling said casing for holding bottles to be sterilized simultaneously with the heating of said container, and a circumferential perforated flange below said pockets for holding additional articles to be sterilized.

Signed at Philadelphia, county of Philadelphia, State of Pennsylvania, this 2d day of Nov., 1928.

ELIZABETH C. SULLIVAN.